(12) United States Patent
Mittal et al.

(10) Patent No.: US 12,192,543 B2
(45) Date of Patent: Jan. 7, 2025

(54) VIDEO FRAME ACTION DETECTION USING GATED HISTORY

(71) Applicant: Microsoft Technology Licensing, LLC, Redmond, WA (US)

(72) Inventors: Gaurav Mittal, Redmond, WA (US); Ye Yu, Redmond, WA (US); Mei Chen, Bellevue, WA (US); Junwen Chen, Rochester, NY (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/393,664

(22) Filed: Dec. 21, 2023

(65) Prior Publication Data

US 2024/0244279 A1    Jul. 18, 2024

Related U.S. Application Data

(63) Continuation of application No. 17/852,310, filed on Jun. 28, 2022, now Pat. No. 11,895,343.

(60) Provisional application No. 63/348,993, filed on Jun. 3, 2022.

(51) Int. Cl.
*H04N 21/23* (2011.01)
*G06T 7/246* (2017.01)
*G06V 20/40* (2022.01)
*H04N 21/234* (2011.01)

(52) U.S. Cl.
CPC ....... *H04N 21/23418* (2013.01); *G06T 7/246* (2017.01); *G06V 20/46* (2022.01); *G06T 2207/10021* (2013.01)

(58) Field of Classification Search
None
See application file for complete search history.

(56) References Cited

U.S. PATENT DOCUMENTS

2022/0121853 A1* 4/2022 Son .................. G06V 10/82

* cited by examiner

*Primary Examiner* — Cai Y Chen
(74) *Attorney, Agent, or Firm* — Foley IP Law, PLLC

(57) ABSTRACT

Example solutions for video frame action detection use a gated history and include: receiving a video stream comprising a plurality of video frames; grouping the plurality of video frames into a set of present video frames and a set of historical video frames, the set of present video frames comprising a current video frame; determining a set of attention weights for the set of historical video frames, the set of attention weights indicating how informative a video frame is for predicting action in the current video frame; weighting the set of historical video frames with the set of attention weights to produce a set of weighted historical video frames; and based on at least the set of weighted historical video frames and the set of present video frames, generating an action prediction for the current video frame.

20 Claims, 10 Drawing Sheets

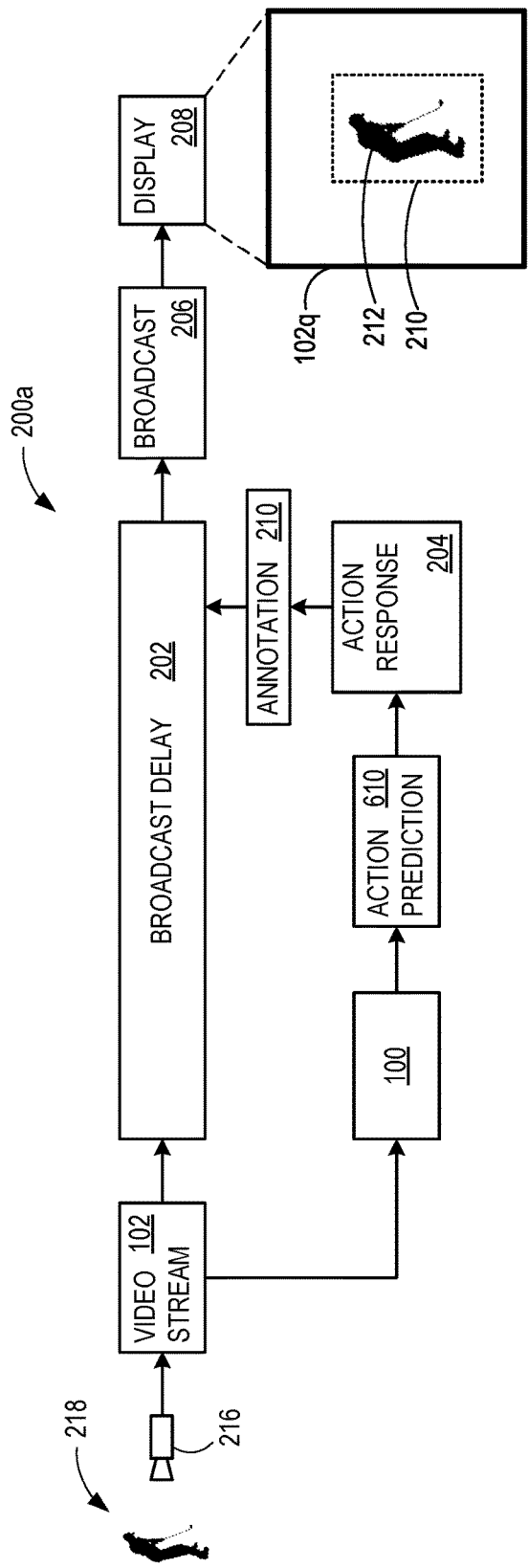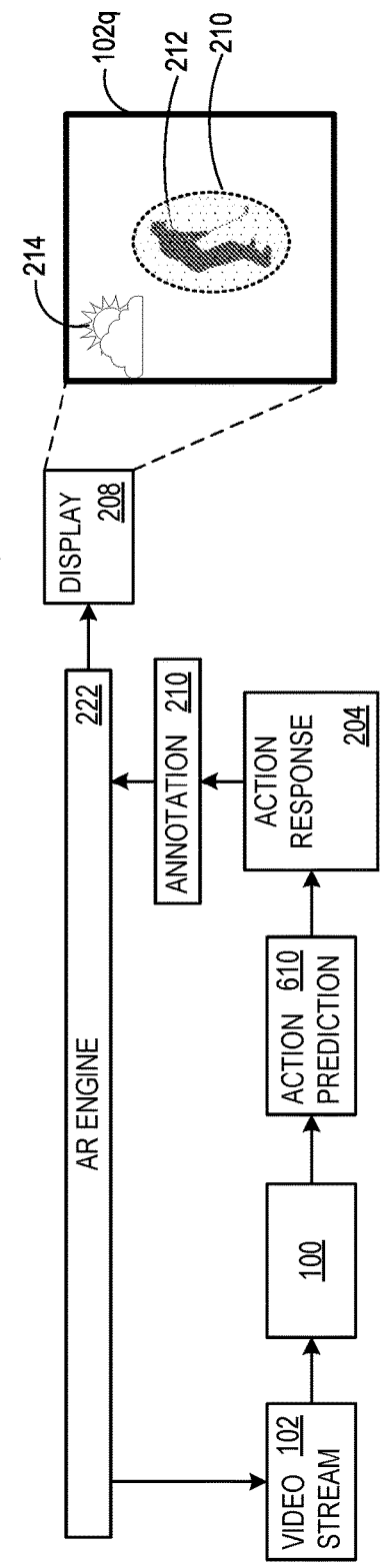

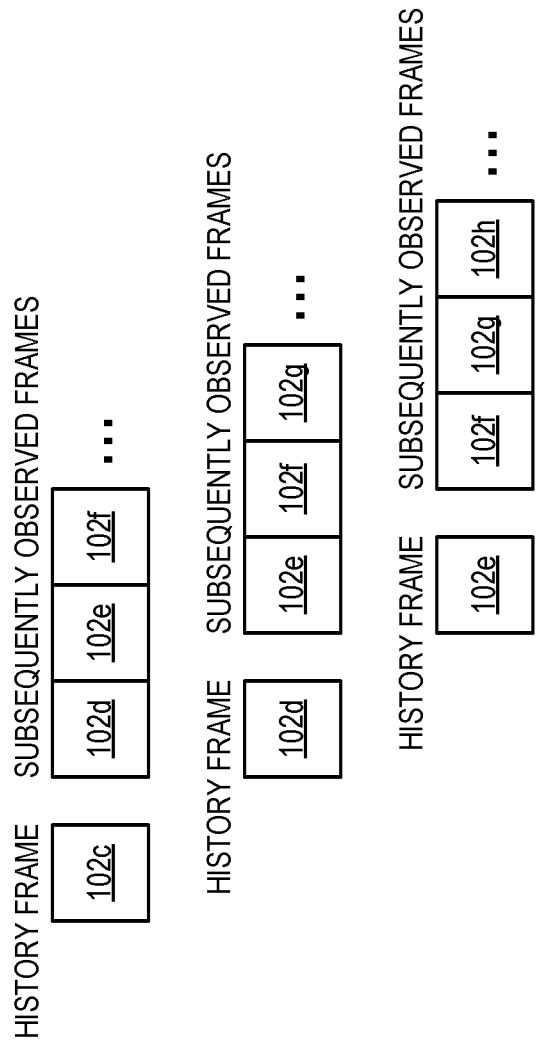

VIDEO FRAME ACTION DETECTION USING GATED HISTORY

CROSS-REFERENCE TO RELATED APPLICATION

This application is a continuation of and claims priority to U.S. patent application Ser. No. 17/852,310, entitled "VIDEO FRAME ACTION DETECTION USING GATED HISTORY," filed on Jun. 28, 2022, which claims priority to U.S. Provisional Patent Application No. 63/348,993, entitled "VIDEO FRAME ACTION DETECTION USING GATED HISTORY," filed on Jun. 3, 2022, the disclosures of which are incorporated herein by reference in their entireties.

BACKGROUND

Detecting action in real-time in streaming videos has application to multiple scenarios such as content moderation (e.g., proactively detecting suspicious/toxic activity), public safety (e.g., detecting anomalous events in security video), and in retail (e.g., loss prevention). Video frame action detection is challenging due to the unavailability of future video frames at any given time for predicting action in the current video frame. Limited context for the current video frame results in a higher false positive rate for "no action" video frames (e.g., "no action" video frames being incorrectly identified as "action" video frames).

Existing solutions for video frame action detection commonly use historical video frames in network models. However, not every historical video frame is informative for guiding identification and classification of possible action (or lack thereof) in later video frames. In some scenarios, the use of uninformative history may actually worsen the false positive rate.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for video frame action detection use a gated history and include: receiving a video stream comprising a plurality of video frames; grouping the plurality of video frames into a set of present video frames and a set of historical video frames, the set of present video frames comprising a current video frame; determining a set of attention weights for the set of historical video frames, the set of attention weights indicating how informative a video frame is for predicting action in the current video frame; weighting the set of historical video frames with the set of attention weights to produce a set of weighted historical video frames; and based on at least the set of weighted historical video frames and the set of present video frames, generating an action prediction for the current video frame.

BRIEF DESCRIPTION OF THE DRAWINGS

The disclosed examples are described in detail below with reference to the accompanying drawing figures listed below:

FIGS. 2A and 2B illustrate practical applications for using examples of the architecture of FIG. 1;

FIG. 5B illustrates additional detail for FIG. 5A;

Corresponding reference characters indicate corresponding parts throughout the drawings.

DETAILED DESCRIPTION

Figure 1:
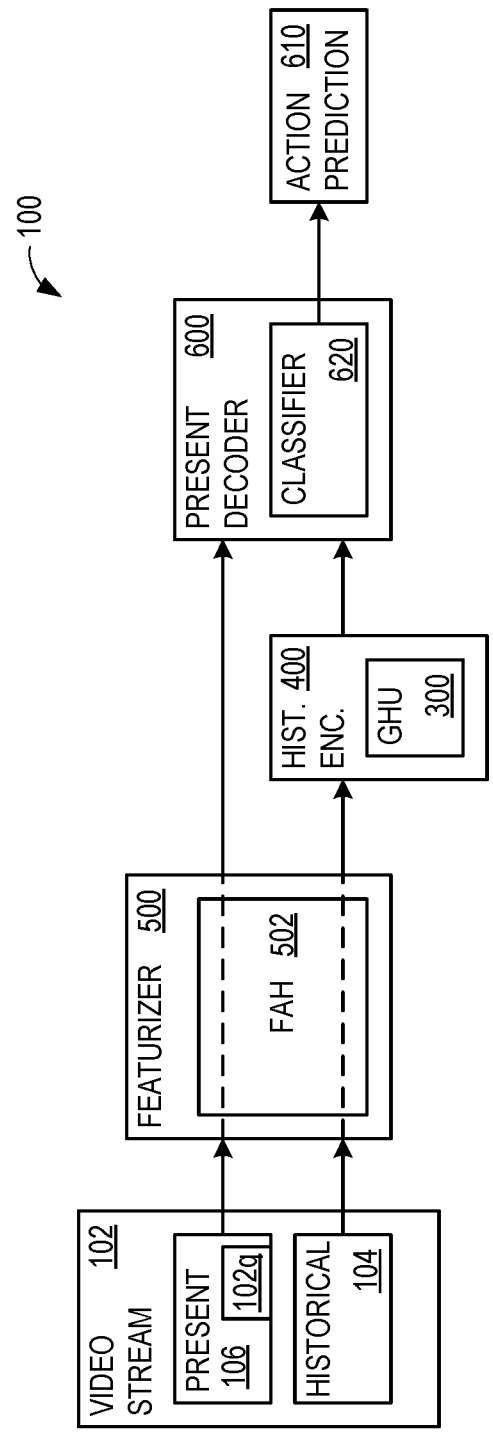
FIG. 1 illustrates an example architecture that advantageously provides for video frame action detection using gated history.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Online action detection is the task of predicting the action as soon as it happens in streaming video, such as a golfer beginning to swing a club or a person beginning to speak. In contrast, with action detection in an offline setting, the entire untrimmed video is observable at any given moment, making detection of the particular frame at which action begins considerably easier. A major challenge for online action detection is that the predictions are solely based on observations of history (i.e., the video frames observed thus far) for context when making predictions, without access to video frames in the future.

The primary challenge in leveraging history of action detection is that for long untrimmed videos, the length becomes intractably long over time. One option is to limit the history to only on the most recent frames, for example a minute or less. Unfortunately, informative history may be discarded and provides no value (i.e., does not improve the probability of making a correct action/no-action prediction). Not every history frame is informative and useful, and some uninformative history may actually degrade accuracy, if used.

It is therefore valuable to accentuate portions the history that are more informative to the prediction of the current frame in online action detection with untrimmed streaming video. The disclosure presents a position-guided gated cross-attention mechanism to enhance or suppress portions of the history based on how informative they are for current frame prediction. Some examples further render history features more informative, by using subsequently observed frames when available.

The disclosure integrates a transformer's ability of long-range temporal modeling and a recurrent model's capacity to selectively encode relevant information. Some examples also introduce a background suppression objective to further mitigate false positive background frames that closely resemble action frames. Additionally, a flow-free version is able to achieve higher or close accuracy at a higher frame rate to prior solutions that require both color pixel information ("RGB") and optical flow information for prediction.

Example solutions for video frame action detection (a.k.a. online action detection) use a gated history and include: receiving a video stream comprising a plurality of video frames; grouping the plurality of video frames into a set of present video frames and a set of historical video frames, the set of present video frames comprising a current video frame; determining a set of attention weights for the set of historical video frames, the set of attention weights indicating how informative a video frame is for predicting action in the current video frame; weighting the set of historical video frames with the set of attention weights to produce a set of weighted historical video frames; and based on at least the set of weighted historical video frames and the set of present video frames, generating an action prediction for the current video frame.

Aspects of the disclosure improve the operations of computing devices, for example, improving the accuracy and/or speed of video frame action detection at least by weighting a set of historical video frames with a set of attention weights that indicate how informative a video frame is for predicting action in the current video frame. Examples combine the benefits of selective encoding of a long-short term memory (LSTM) recurrent neural network (NN) with long-range modeling of a transformer to better leverage informative frames in a long-duration history. Practical applications include: safety, surveillance, content moderation, augmented reality (AR), self-driving cars, and autonomous vehicles.

FIG. 1A illustrates an example architecture 100 that advantageously provides for video frame action detection using gated history. A video stream 102 has a set of present video frames 106 that includes a current video frame 102q, and a set of historical video frames 104 that together form a long history. For example, a current video frame is an immediately present frame while a set of present video frames includes the immediately present frame (or current frame) as well as one or more immediate past present frames. In other words, the set of present video frames include the most immediate previous frames to the current video frame for a given point in time. (See FIG. 5A for more detail.) Video stream 102 is provided to a featurizer 500, which includes a future-augmented history (FAH) 502 component. A history encoder 400, which includes a gated history unit (GHU) 300, determines a set of attention weights and uses the set to weight set of historical video frames 104 (and also some or all of set of present video frames 106). This produces a set of weighted historical video frames that is provided to a present decoder 600.

In parallel, featurizer 500 also encodes set of present video frames 106 and provides that as an additional input to present decoder 600. Present decoder 600 has a set of attention networks and a classifier 620 that outputs an action prediction 610 for at least current video frame 102q. GHU 300 is described in further detail in relation to FIG. 3. History encoder 400 is described in further detail in relation to FIG. 4. Featurizer 500 and FAH are described in further detail in relation to FIG. 5. Present decoder 600 and background suppression are described in further detail in relation to FIG. 7. Video stream 102, set of present video frames 106, and set of historical video frames 104 are shown in further detail in relation to FIG. 7. A more detailed operation of architecture 100 is provided after describing the various components in each of FIGS. 2-7.

FIGS. 2A and 2B illustrate two among many practical applications for using the architecture of FIG. 1. In FIG. 2A, a video frame action detection scenario 200a depicts a video camera 216 capturing a scene 218 and outputting video stream 102, which is subject to a broadcast delay 202. Video stream 102 is also provided to architecture 100 that outputs action prediction 610. Action prediction 610 is provided to an action response 204 that responds to action prediction 610 based on the class of the predicted action and the specific application being employed for the video frame action detection (e.g., safety, surveillance, content moderation, AR, self-driving car, autonomous vehicle, or other). In the current scenario 200a, the predicted action is represented as an annotation 210 superimposed on current video frame 102q.

Architecture 100 operates in real-time, such that annotation 210 is ready during broadcast delay 202, which may on the order of seconds (e.g., seven seconds, in some examples). A broadcast function 206 transmits current video frame 102q to a display 208, where current video frame 102q is displayed with annotation 210. In this illustrated example, annotation 210 comprises an outline of an object 212 involved with action prediction 610, for example, a golfer swinging a golf club. In this scenario, action prediction 610 is not offensive, but is instead the type of action for which a viewer's attention is desired.

In FIG. 2B, a video frame action detection scenario 200b depicts an AR engine 222 generating video stream 102, for example by mixing a live scene capture by a camera (e.g., video camera 216 and scene 218 of scenario 200a). Video stream 102 is provided to architecture 100 that outputs action prediction 610. Action prediction 610 is provided to action response 204 that responds to action prediction 610 based on the specific application being employed for the video frame action detection. In the current scenario 200a, the action is also an annotation 210 superimposed on current video frame 102q.

Architecture 100 operates in real-time, such that annotation 210 is ready at approximately the same time as AR engine 222 is able to insert icons (e.g., AR object 214) and/or virtual objects into current video frame 102q. AR engine 222 provides current video frame 102q to display 208, where current video frame 102q is displayed with annotation 210. In this illustrated example, annotation 210 comprises a brightening of pixels in a region of current video frame 102q in proximity to object 212 involved with action prediction 610. Other annotation possibilities include an obscuration of the object involved with the action prediction and blanking the current video frame, for example if the predicted action is a class that indicates offensive material.

Multiple additional practical applications exist for architecture 100. For example, architecture 100, including training and testing, may be operated and deployed in customer premises such as internet of things (IoT) and edge devices. For example, architecture 100 may be deployed in a retail store where one or more surveillance cameras capture video feed for long durations. The video feed may be annotated and utilized to train architecture 100 for online action detection of actions/events including customer behavior, and suspicious or criminal activities. Upon training, architecture 100 model may be deployed in the on-premises IoT devices for the online detection of the actions and events.

Further deployments may leverage edge artificial intelligence (AI) scenarios such as on-premises devices and cloud services. Architecture 100 may perform action anticipation tasks by training the model such that, rather than predicting the action for the current observed frame, it predicts the action for a frame that will be observed sometime later, in the future. This is useful in scenarios for content moderation in live-video streams where the model may predict if some harmful or otherwise inappropriate activity is about to occur and allow for a time buffer to block the video feed in time.

This application may also be useful in autonomous driving where it may help predict the trajectory of vehicles and pedestrians on the road in advance, to ensure informed driving-related decisions. It may further benefit augmented reality (AR) scenarios in which the intent and the behavior of users may be anticipated to improve user experience.

Although architecture 100 performs online action detection where the future frames are unavailable to the model, architecture 100 may also perform per-frame action prediction in offline settings, in which access to all frames of the video stream is available. To do so, the current frame may be set as the middle frame in the present decoder of the model, with frames subsequently observed after the current frame being "future" frames. This way, the model may leverage the future frames available in the offline setting for per-frame action prediction. The ability to perform per-frame action prediction in an offline setting is beneficial in scenarios that are not time critical, and the primary objective is improving the accuracy of action prediction across the entire video stream.

Some examples of such scenarios include generating highlights of a sports event to telecast at a later time, or assisting coaches to assess a player's performance. Other scenarios include analyzing a video uploaded by a user for any assessing activity occurring at an unknown location within the video stream.

In some examples, architecture 100 may take input and process features from multiple modalities simultaneously to improve the performance of action detection. Modality may include RGB-based appearance, optical flow/motion, depth data from time-of-flight sensors, audio data, text and/or language data, data from sensors such as accelerometer, gyroscope, magnetometer etc. or the like. This may support several multimodal user scenarios such as audio-visual content moderation, autonomous driving involving multiple sensors and AR/metaverse involving both RGB and depth sensors. Architecture 100 may support multimodal scenarios for various tasks—online action detection, action anticipation and per-frame offline action detection.

Figure 3:
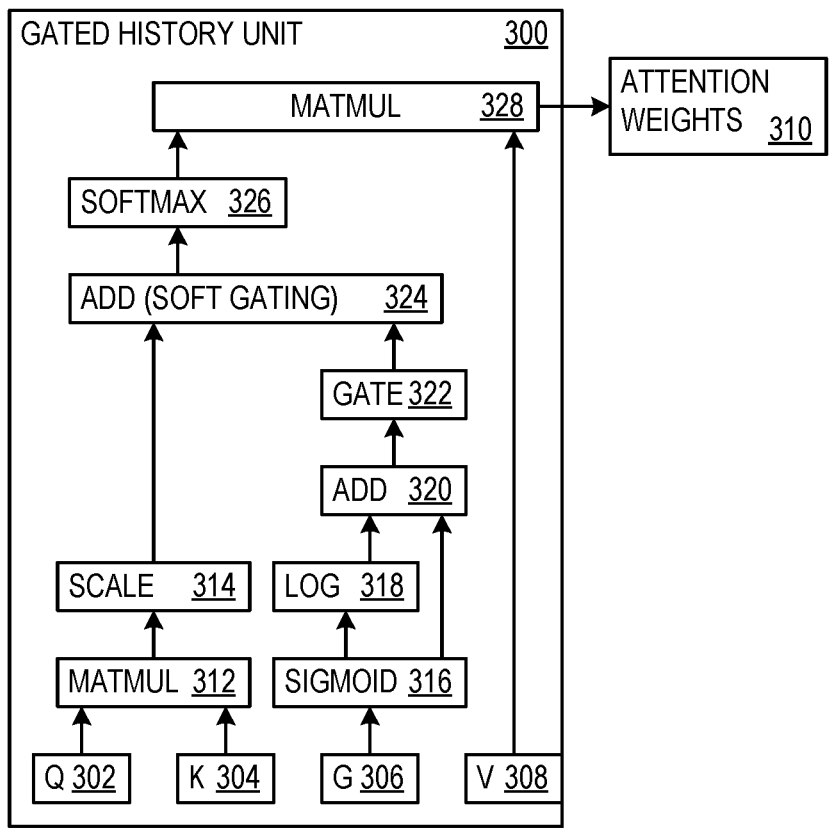
FIG. 3 illustrates an example gated history unit (GHU) of the architecture of FIG. 1.

FIG. 3 illustrates GHU 300, a position-guided gated cross-attention component of architecture 100 that enhances or suppresses frames of video stream 102 (e.g., frames of set of historical video frames 104) according to how informative each frame is for predicting action for current frame 103q. An introduction to the components of GHU 300 are provided here, and further details regarding operation of GHU 300 are provides after the other various components of architecture 100 are similarly introduced in FIGS. 4-7.

A query (Q 302), key (K 304), and value (V 308) are provided by featurizer 500. A gating score (G 306) is a separate learned encoding that in some examples, ranges from negative infinity to e (2.78). Q 302 and K 304 are provided to a matrix multiplication 312, which is then scaled by a scaler 314. G 306 is provided to a sigmoid function 316, the output is subjected to a log function 318 and added to itself by an addition 320. That is gated by a gate 322 and added to the output of scaler 314 by a soft gating addition 324. A softmax 326 is applied and the result is provided to a matrix multiplication 328 with V 308. This produces set of attention weights 310 for at least set of historical video frames 104 (and set of present video frames 106, in some examples).

Figure 4:
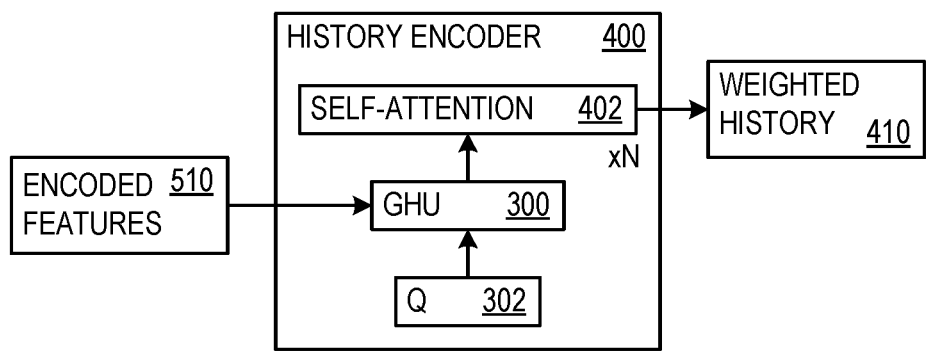
FIG. 4 illustrates an example history encoder of the architecture of FIG. 1.

FIG. 4 illustrates history encoder 400. A set of encoded features (described below, for example in relation to FIG. 5) is provided to GHU 300, along with Q 302. The output of GHU 300 (e.g., set of attention weights 310) is provided to a self-attention network 402 that outputs a set of weighted historical video frames 410.

Figure 5A:
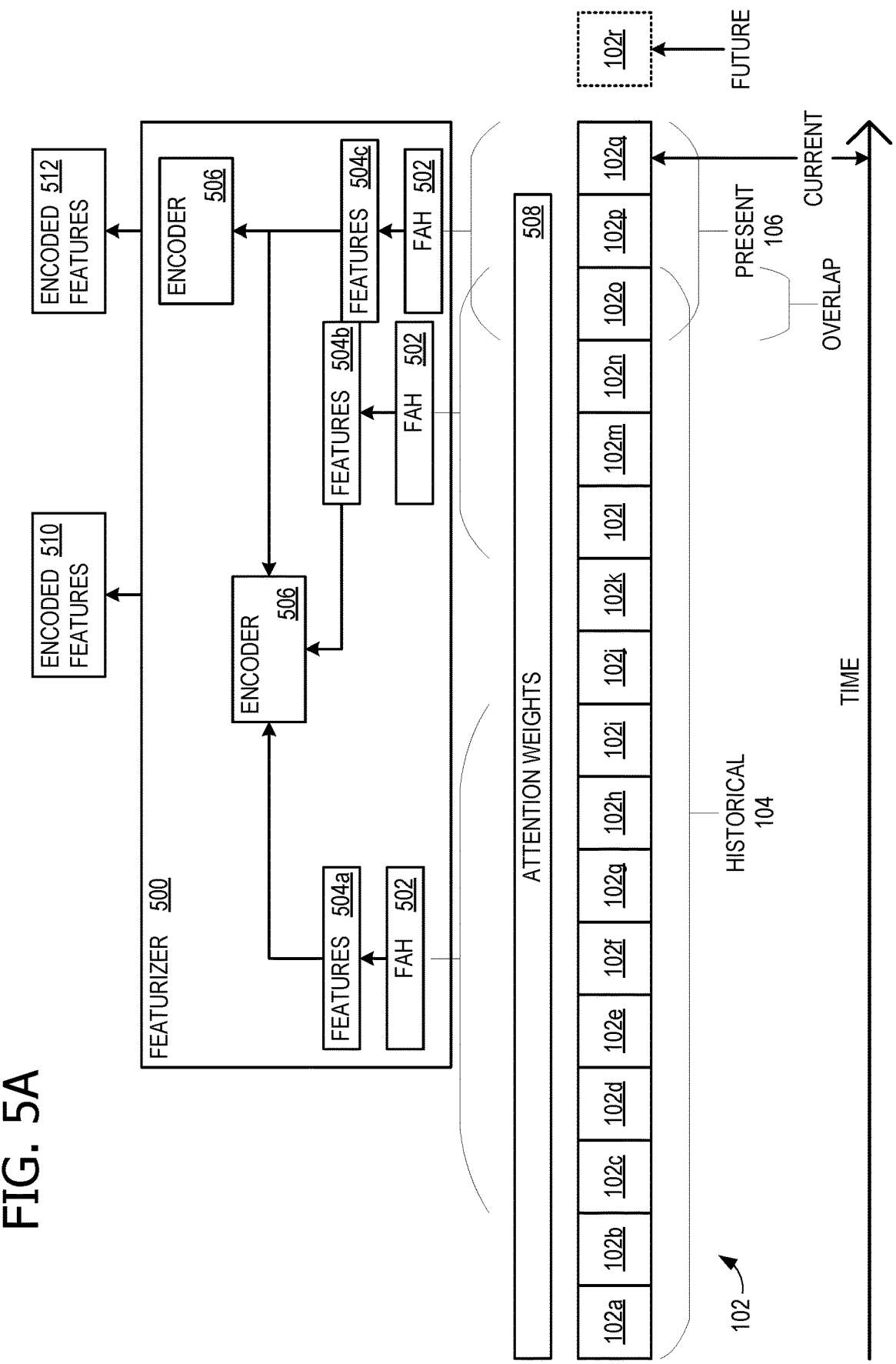
FIG. 5A illustrates an example video stream comprising a plurality of video frames and a future augmented history (FAH) encoder of the architecture of FIG. 1.

FIG. 5A illustrates featurizer 500 and further detail regarding video stream 102. Video stream 102 is illustrated as comprising a plurality of video frames, video frames 102a-102q. Set of historical video frames 104 includes video frame 102a, video frame 102b, video frame 102c, video frame 102d, video frame 102e, video frame 102f, video frame 102g, video frame 102h, video frame 102i, video frame 102j, video frame 102k, video frame 102l, video frame 102m, video frame 102n, and video frame 102o.

Set of present video frames 106 is the set of the most recent video frames, including the latest frame (or immediately present frame), current video frame 102q. Set of present video frames 106 also includes video frame 102o and video frame 102p, which are the immediate past present frames relative to current video frame 102q. Video frame 102o is also in set of historical video frames 104, providing overlap between set of historical video frames 104 and set of present video frames 106. A future video frame 102r is not yet available. It should be understood that these numbers of video frames are for illustrative purposes, and some examples of architecture 100 may use a significantly larger number of video frames.

Although current video frame 102q does not have a future video frame (e.g., video frame 102r) available for refining an action prediction, video frames in set of historical video frames 104 do have "future" video frames available. Turning briefly to FIG. 5B, the idea of "future" video frames for historical video frames is illustrated.

For any given video frame within set of historical video frames 104, and video frame may be designated as a history frame. For each individual history frame, there is a set of subsequently-observed video frames within video stream 102 that is more recent in time than that individual history frame. For example, for video frame 102c, video frames 102d, 102e, and 102f are more recent; for video frame 102d, video frames 102e, 102f, and 102g are more recent; and for video frame 102e, video frames 102f, 102g, and 102h are more recent. From the perspective of any given history frame, the set of subsequently-observed video frames represents "future" video frames relative to that given history frame, because those "future" video frames are later in time relative to the history frame.

This can be exploited to improve set of historical video frames 104, providing for future-augmented encoding by FAH 502. In other words, FAH 502 leverages hindsight to provide "future" frames for history frames to improve the encoding of history for current frame prediction. FAH 502 aggregates observed "future" information into the features of a history frame to make it aware of its so-far-observable future. At each new time step with one more new frame observed, FAH 502 will feed-forward through the feature extraction backbone twice to extract features for the new frame.

Returning to FIG. 5A, video stream 102, including set of historical video frames 104 and set of present video frames 106, is weighted by attention weights 508. Video frames of set of historical video frames 104, and video frames of set of present video frames 106 have already been through architecture 100 as the then-current video frame. Thus, they have each been assessed for whether they had action or no action, and so attention weights 508 may be derived by remembering this activity for each of the video frames.

FAH 502 extracts features from only the most informative video frames, producing features 504a and features 504b for set of historical video frames 104, and features 504s for set of present video frames 106. Features 504a-504c are encoded by an encoder 506 into encoded features 510 that is provided to history encoder 400 of FIG. 4. Features 504c are encoded by encoder 506 into encoded features 512 that is provided to present decoder 600 of FIG. 6.

As described below, some examples of featurizer 500 use optical flow for improved accuracy, but at the expense of slower execution time. Optical flow estimation identifies pixel-wise motion of objects (e.g., object 212 of FIG. 2) between consecutive video frames. Some examples of featurizer 500 do not use optical flow, but instead use only red, green, and blue (RGB) pixel information to improve computation time, for example cutting up to two-thirds of the execution time. Some examples of architecture 100 may operate in time-critical applications and/or on lower-performance computational platforms, and thus not use optical flow.

Figure 6:
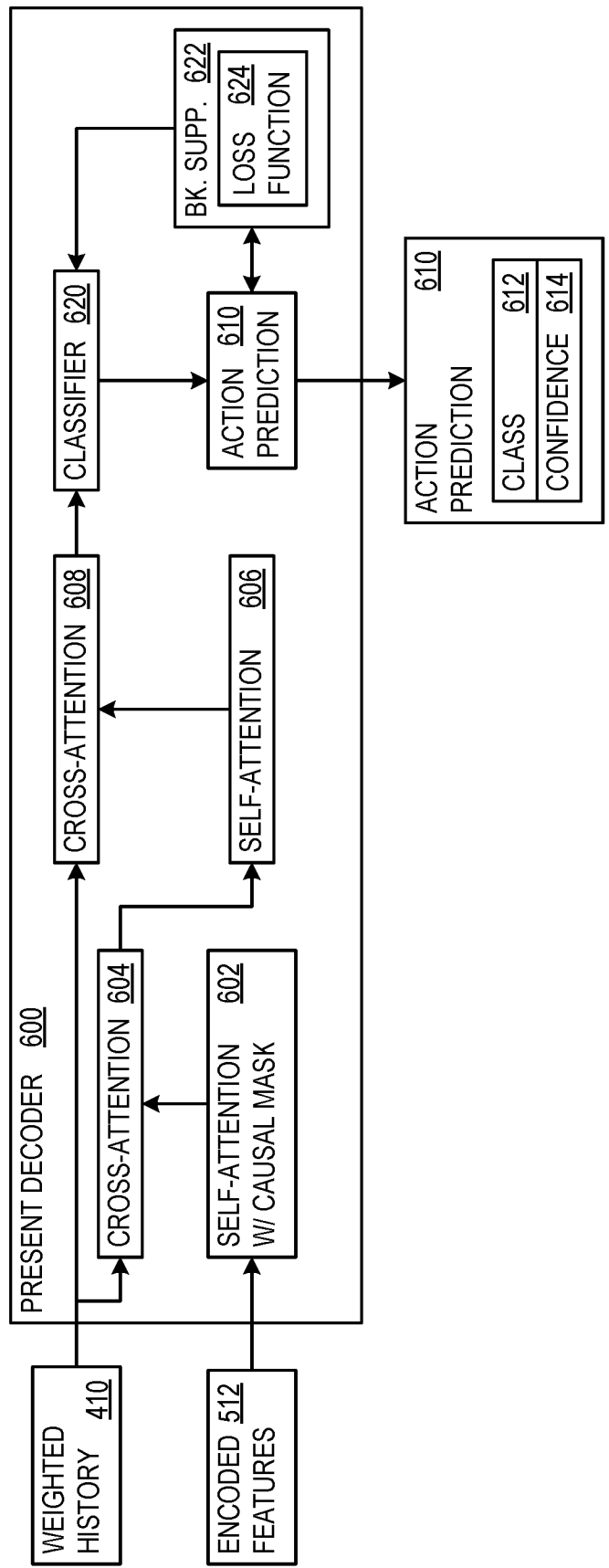
FIG. 6 illustrates an example present decoder of the architecture of FIG. 1.

FIG. 6 illustrates present decoder 600 that correlates a small set of the most recent video frames (e.g., set of present video frames 106) with history of video stream 102 (e.g., at least set of historical video frames 104) to make the current frame prediction. Encoded features 512 and set of weighted historical video frames 410 are provided to a set of attention networks. For example, encoded features 512 is provided to a self-attention network 602 with a causal mask, and the output of that is provided to a cross-attention network 604, along with set of weighted historical video frames 410.

The output of cross-attention network 604 is provided to both another self-attention network 606 and, along with the output of self-attention network 606, to another cross-attention network 608. The output of cross-attention network 608 is provided to classifier 620 that outputs action prediction 610. In some examples, action prediction 610 includes both an action class 612 (e.g., "no action" or one of a pre-defined set of action classes) and a confidence 614, which is a measure of how confident classifier 620 is regarding action prediction 610.

Some examples of present decoder 600 also use background suppression 622 to mitigate the false positive prediction of background frames that closely resemble action frames. Background suppression 622 uses a loss function 624 and is applied as a loss on classifier 620. Background suppression 622 adds emphasis on low confidence predictions that occur between no action video frames and action video frames, to incentivize learning these frames correctly—so that classifier 620 is trained better. In other words, background suppression 622 modifies the confidence of the action prediction by weighting low confidence video frames more heavily, with separate emphasis on action and background classes, for classifier 620 that generates the action prediction.

Figure 7:
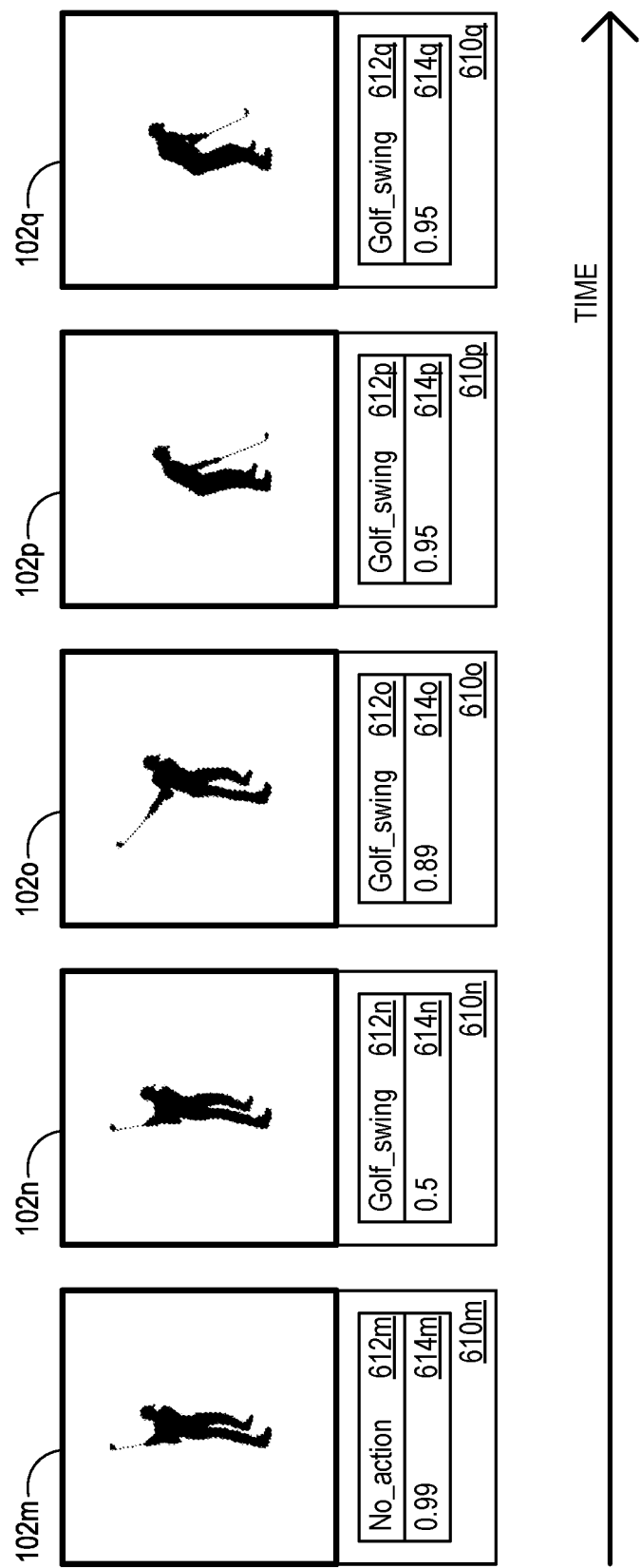
FIG. 7 illustrates example no action video frames, low confidence action video frames, and high confidence action video frames, as may be encountered when using examples of the architecture of FIG. 1.

FIG. 7 illustrates no action video frames, low confidence action video frames, and high confidence action video frames, as may be encountered when using examples of architecture 100. Action prediction 610m for video frame 102m shows an action class 612m as "no action" and confidence 612m as relatively high. Action prediction 610n for video frame 102n shows an action class 612n as "golf swing" and confidence 612n as relatively low. Action prediction 610o for video frame 102o shows an action class 612o as "golf swing" and confidence 612o as relatively high. Action prediction 610p for video frame 102p shows an action class 612p as "golf swing" and confidence 612p as relatively high. Action prediction 610q for current video frame 102q shows an action class 612q as "golf swing" and confidence 612q as relatively high.

Thus, video frame 102m is a no action video frame, video frame 102n is a low confidence action video frame, and video frames 102o-102q are high confidence action video frames. Background suppression 622 modifies the confidence, for example by using loss function 624, to place emphasis on video frame 102n when training classifier 620. In some examples, confidence values range from zero to one, [0, 1], and denotes the probability of predicting the correct action.

Further detail is now provided for the operation of architecture 100. Architecture 100 includes GHU 300, FAH 502, and background suppression 622, which enable improving accuracy and/or speeding execution time by a factor of approximately 3×. GHU 300 provides position-guided, gated cross-attention that explicitly enhances or suppresses parts of video history as per how informative they are to predicting action for the current frame. FAH 502 extracts features from history frames using their subsequently observed frames, to enhance history encoding. Background suppression 622 mitigates false positive predictions of background frames that closely resemble action frames.

Given a streaming video sequence $h=[h_t]_{t=-T+1}^{0}$ (video stream 102), the task is to identify if and what action $y_0 \in \{0, 1, \ldots C\}$ occurs at the current frame $h_0$ (i.e., $h_0$ is current frame 102q). There is a total of C action classes and a label "0" for background frames with no action (i.e., action class 612=0 for "no action" video frames) are available for use by classifier 620. Since future frames denoted as $h_1, h_2, \ldots$, (e.g., future video frame 102r and others) are not yet accessible, the network model makes a (C+1)-way prediction for the current frame ($h_0$) based on the recent T frames, $h=[h_t]_{t=-T+1}^{0}$, observed up until the current frame. While T may be large in an untrimmed video stream, all frames observed in past history $h=[h_t]_{t=-T+1}^{0}$ may not be equally informative to the prediction for the current frame.

To make the (C+1)-way prediction accurately for current frame $h_0$ based on T history frames, $h=[h_t]_{t=-T+1}^{0}$, transformers encode the video sequence history (e.g., at least set of historical video frames 106 of video stream 102) and then associate the current frame with the encoding for prediction. History encoder 400 uses cross-attention to project the variable length history to a fixed-length learned latent encoding. Using cross-attention may be more efficient than using self-attention because its computational complexity is quadratic with respect to latent encoding size, instead of the video sequence length which is typically orders of magnitude larger. In some scenarios, the resulting execution time difference is important for online video.

Specifically, given $$h = [h_t]_{t=-T+1}^{0}$$

as the streaming sequence of T history frames ending at current frame $h_0$, each frame h is encoded with a feature extraction backbone, u, followed by a linear encoding layer E. The output is subjected to a learnable position encoding, $E_{OS}$, relative to the current frame, $h_0$, to give $z^h = u(h)E + E_{POS}$, where $u(h) \in \mathbb{R}^{T \times M}$, $E \in \mathbb{R}^{M \times D}$, $z^h \in \mathbb{R}^{T \times D}$ and $E_{POS} \in \mathbb{R}^{T \times D}$. M and D denote the dimensions of extracted features and post-linear encoding features, respectively. A learnable latent query encoding, $q \in \mathbb{R}^{L \times D}$, is cross-attended with h. Following a multi-headed cross-attention setup, $N_{HEADS}$ is the number of heads in GHU 300 such that $Q_i = qW_i^q$, $K_i = z^h W_i^k$, and $V_i = z^h W_i^v$ are queries, keys and values, respectively (i.e., Q 302, K 304, and V 308), for each head $i \in \{1, \ldots, N_{HEADS}\}$ where projection matrices $W_i^q, W_i^k \in \mathbb{R}^{\times d_v}$. There is an assignment of $d_k = d_v = D/N_{HEADS}$.

The position-guided gating scores G are obtained, for h by:

$$z^g = \sigma(z^h W^g) \qquad \text{Eq. (1)}$$

$$G = \log(z^g) + z^g \qquad \text{Eq. (2)}$$

where $W^g \in \mathbb{R}^{D \times 1}$ is the matrix projecting each history frame to a scalar. Then, $z^g \in \mathbb{R}^{T \times 1}$ is a sequence of scalars for the history frames h after applying sigmoid $\sigma$.

The gating score (G 308) for history frames in GHU 300 is $G \in \mathbb{R}^{T \times 1}$. By using $z^h$, which already contains the position encoding, the gates are guided by the relative position of the history frame to the current frame $h_0$. The gated cross-attention for each head, $GHU_i$, is computed as:

$$GHU_i = \text{Softmax}\left(\frac{Q_i K_i^T}{\sqrt{d_k}} + G\right) V_i \qquad \text{Eq. (3)}$$

And multi-headed gated cross-attention defined as:

$$MultiHeadGHU(Q, K, V, G) = Concat\left([GHU_i]_{i=0}^{N_{HEADS}}\right) W^0 \qquad \text{Eq. (4)}$$

where $W^0 \in \mathbb{R}^{D \times D}$ re-projects the attention output to D dimensions. It is possible to define G separately for each, however, in some examples, sharing G across all heads performs better.

From Eqs. (1) and (2), it can be observed that each scalar in $z_g$ lies in [0, 1] due to sigmoid, which implies that each gating score in G lies in $[-\infty, 1]$. This enables the softmax function in Eq. (3) to calibrate the attention weight for each history frame by a factor in [0, e] such that a factor in [0, 1) suppresses a given history frame and a factor in (1, e] enhances a given history frame. This provides an explicit ability for GHU 300 to learn to calibrate the attention weight of a history frame based on how informative the history frame is for prediction of current frame $h_0$.

Thus, G is input-dependent and learns based on the history frame and its position with respect to the current frame. This enables GHU 300 to assess how informative each history frame is based on its feature representation and relative position from the current frame $h_0$. The output of GHU 300 is fed to a series of N self-attention layers (self-attention network 402) to obtain the final history encoding (i.e., set of weighted historical video frames 410) output from history encoder 400.

FAH 502 leverages hindsight to provide "future" frames for history frames to improve the encoding of history for current frame prediction. (See FIG. 5B.) FAH 502 aggregates observed "future" information into the features of a history frame to make it aware of its so-far-observable future. For a history frame $h_t$ and a feature extraction backbone u, when $t_f$ "future" history frames for $h_t$ may be observed, FAH 502 extracts features for $h_t$ using a set of frames $$[h_i]_{i=t}^{t+t_f}$$

(i.e., the history frame itself and its subsequently observed $t_f$ future frames). Otherwise, FAH 502 extracts features for $h_t$ using a set of frames $$[h_i]_{i=t-t_{ps}}^{t}$$

(i.e., the history frame itself and its past $t_{ps}$ frames):

$$u(h_t) = \begin{cases} u\left([h_i]_{i=t-t_{ps}}^{t}\right), & \text{if } t > -t_f \\ u\left([h_i]_{i=t}^{t+t_f}\right), & \text{if } t \leq -t_f \end{cases} \qquad \text{Eq. (5)}$$

At each new time step with one more new frame observed, FAH 502 will feed-forward through u twice to extract features for the new frame using $$[h_i]_{i=-t_{ps}}^{0}$$

frames and, also $h_{-t_f}$ that is now eligible to aggregate future information using $$[h_i]_{i=-t_f}^{0}$$

frames.

In order to correlate the present with the history to perform the current frame prediction, a subset of $t_{pr}$ most recent history frames $$[h_i]_{t=-t_{pr}-1}^{t}$$

is sampled to model the present (i.e., the most immediate context) for $h_0$ using present decoder 600. After extracting the features via FAH 500, a learnable position encoding, $$E_{pos}^{pr}$$

is applied to each of the $t_{pr}$ frame features, which are subjected to a multi-headed self-attention with a causal mask. The causal mask limits the influence of only the preceding frames on a given frame.

The output from self-attention is cross-attended with the history encoding from history encoder 400. This is repeated, although the self-attention does not need a causal mask the second time. The output corresponding to each of $t_{pr}$ frames is fed to the classifier layer (e.g., classifier 620) for prediction.

Background ("no action") video frames may be anything from completely blank at the beginning of video stream 102 to closely resembling action frames—but without actually being action frames (e.g., aiming before making a billiards shot). The latter scenario is a common cause for false positives (e.g., classifying a "no action" video frame as an "action" video frame). To reduce false positives, background suppression 622 applies emphasis to low-confident action and background predictions during training of classifier 620 to increase the margin between action and background ("no action") video frames.

The objective (loss) function, Lt, (loss function 524) for frame $h_t$ is defined as:

$$\mathcal{L}_t = \begin{cases} -y_t^0(1-p_t^0)^{\gamma_b}\log(p_t^0), & \text{if } t > -t_f \\ -\sum_{i=1}^{C} y_t^i(1-p_t^i)^{\gamma_a}\log(p_t^i), & \text{if } t \leq -t_f \end{cases} \quad \text{Eq. (6)}$$

where $\gamma_a$, $\gamma_b > 0$, enables low-confident samples to contribute more to the overall loss forcing the model to put more emphasis on correctly predicting these samples. Loss function 524 ($\mathcal{L}_t$) applying separate $\gamma$ to action classes and background. This separation distinguishes the action classes that have a more constrained distribution from the background class, whose distribution is more complex and unconstrained.

Some examples use optical flow in addition to RGB to capture fine-grained motion among frames. Computing optical flow, however, requires more computational time than feature extraction or model inference alone, and may be too slow in some scenarios for time-critical applications (e.g., autonomous vehicles and self-driving cars). Thus, some examples do not use optical flow.

To capture motion without optical flow using only RGB frames, multiple temporal resolutions using a spatio-temporal backbone is used, in some examples. In some examples, two feature vectors are extracted for a frame $h_t$ by encoding a frame sequence sampled at a higher frame rate, spanning a smaller time duration, and another frame sequence sampled at a lower frame rate spanning, a longer time duration. The two feature vectors are concatenated.

In an example, video stream 102 is sampled at 24 frames per second (FPS), and frames are extracted at 4 FPS for training and evaluation. The size of set of historical video frames 104 is set to 1024, and the size of set of present video frames 106 is set to 8 most recently-observed frames. This spans 256 seconds and 2 seconds, respectively, at 4 FPS. A two-stream temporal segment network (TSN) is used to extract frame-level RGB and optical flow features. The RGB and optical flow features are concatenated the along channel dimension prior to feeding to a linear encoding layer. The time duration for FAH 502 is set for past $t_{ps}$ and future $t_f$ frames to be 1 second and 2 seconds, respectively.

For a version that does not use optical flow, the optical flow features are replaced with features obtained from an additional multi-frame input of RGB frames uniformly sampled over a duration of 2 seconds. Training is performed for 10 epochs, with a weight decay of 5E-5, and a batch size of 50. D is set to 1024, latent encoding size is 16, and two layers are used in the history decoder. Each attention layer has 16 heads ($N_{HEADS}=16$), and $\gamma_a=0.6$, $\gamma_b=0.2$ for background suppression.

Figure 8:
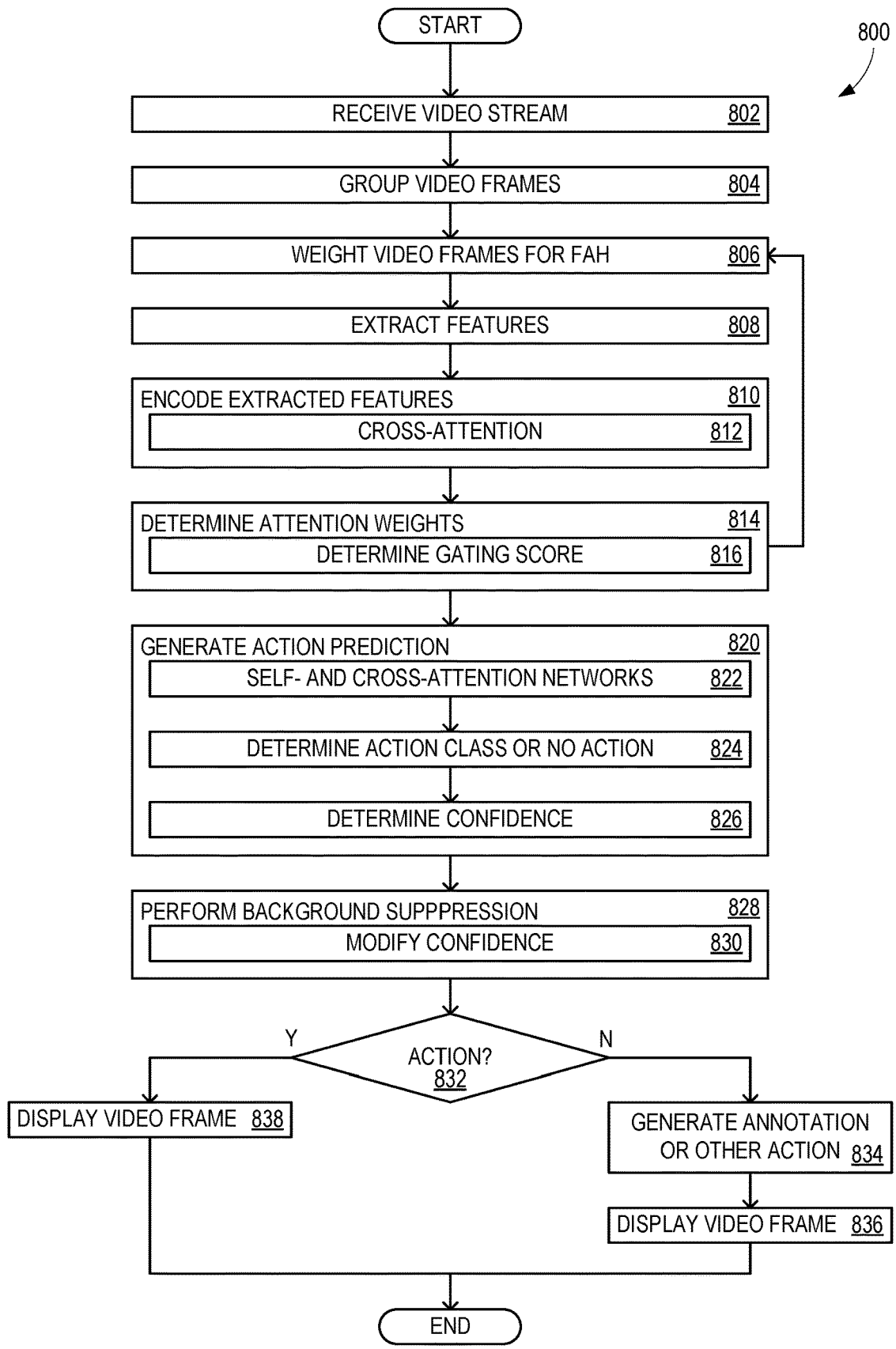
FIG. 8 shows a flowchart illustrating exemplary operations that may be performed using examples of the architecture of FIG. 1.

FIG. 8 shows a flowchart 800 illustrating exemplary operations that may be performed by architecture 100. In some examples, operations described for flowchart 800 are performed by computing device 1000 of FIG. 10. Flowchart 800 commences with receiving video stream 102 comprising a plurality of video frames in operation 802. Given a streaming video sequence, video stream 102 for example, the task is to identify if and what action occurs at the current frame. There may be any number of different action class labels as well as a label for background frames with no action (i.e., "no action" video frames) that are available for use by a classifier, such as classifier 620.

Operation 804 groups plurality of video frames 102a-106q (of video stream 102) into set of present video frames 106 (comprising current video frame 102q) and set of historical video frames 104. In some examples, set of present video frames 106 and set of historical video frames 104 overlaps. Since future frames are not yet accessible, the process uses the recent frames observed up until the current frame to make a prediction for the current frame. While the recent frames may be large in an untrimmed video stream, all frames observed in past history may not be equally informative to the prediction for the current frame. Operation 806 weights the sets of subsequently-observed video frames with previously-determined attention weights.

Operation 808 extracts features 504a and 504b from set of historical video frames 104, based on at least a set of history frames and their sets of subsequently-observed video frames. In some examples, extracting features uses optical flow. In some examples, extracting features does not use optical flow. Operation 810 encodes extracted features 504a and 504b. In some examples, this includes determining a latent encoding for each video frame in set of historical video frames 104. Some examples of operation 810 include operation 812 that encodes extracted features 504a and 504b using cross-attention to project a variable length portion of the plurality of video frames to a fixed-length learned latent encoding.

In some examples, to make the prediction accurately for the current frame based on the history frames, transformers encode the video sequence history (e.g., at least a set of historical video frames 106 of video stream 102) and then associate the current frame with the encoding for prediction. History encoder 400 uses cross-attention to project the variable length history to a fixed-length learned latent encoding. Specifically, each frame is encoded with a feature extraction backbone followed by a linear encoding layer. The output is subjected to a learnable position encoding relative to the current frame. A learnable latent query encoding is then cross-attended with each frame.

Operation 814 determines set of attention weights 310 for set of historical video frames 104. Set of attention weights 310 indicates how informative a video frame is for predicting action in current video frame 102q and enhances or suppresses video frames of set of historical video frames 104 based on at least how informative a video frame is for predicting action in current video frame 102q. In some examples, each attention weight of set of attention weights 310 is positive-valued. In some examples, set of attention weights 310 is within a range of zero to a maximum positive value. A value between 0 and 1 suppresses attention to a video frame and a value between 1 and the maximum positive value enhances attention to a video frame. Some examples of operation 814 use operation 816 that determines, for each video frame of set of historical video frames 104, a position-guided gating score, G 306. In one example, the position-guided gating scores are obtained for each frame using a matrix projecting each history frame to a scalar and generating a sequence of scalars for the history frames after applying the sigmoid function. This enables the softmax function to calibrate the attention weight for each history frame to suppress or enhance a given history frame, and provides an ability for GHU 300 to learn to calibrate the attention weight of a history frame based on how informative the history frame is for prediction of a given current frame. This demonstrates that a position-guided gating score is input-dependent and learns based on the history frame and its position with respect to the current frame. This enables GHU 300 to assess how informative each history frame is based on its feature representation and relative position from the current frame.

Operation 818 weights set of historical video frames 104 with set of attention weights 310 to produce set of weighted historical video frames 410. For example, the output of GHU 300 is fed to a series of self-attention layers, such as self-attention network 402, to obtain the final history encoding, such as set of weighted historical video frames 410, output from history encoder 400. Operation 820 generates action prediction 610 for current video frame 102q based on at least set of weighted historical video frames 410 and set of present video frames 106. Operation 820 uses operations 822-826. Operation 822 generating action prediction 610 for current video frame 102q by cross-attending an encoded history that is based on at least set of weighted historical video frames 410 with a self-attention network output that is based on at least encoded extracted features of set of present video frames 106. In some examples, action prediction 610 comprises a no action prediction or an action class 612 prediction selected from a plurality of action classes, determined in operation 824. In some examples, action prediction 610 comprises confidence 614, determined in operation 826.

Operation 828 performs background suppression, using operation 830 to modify confidence 614, such as by generating loss function 624 for example, that weights low confidence video frames more heavily, with separate emphasis on action and background classes, for classifier 620 that generates action prediction 610. In some examples, training of classifier 620 is ongoing, during operation.

Decision operation 832 determines whether current video frame 102q is classified as an action frame. If so, then based on at least action prediction 610 for current video frame 102q, operation 834 generates annotation 210 for current video frame 102q. In some examples, annotation 210 for current video frame 102q comprises an annotation selected from the list consisting of: an outline of object 212 involved with action prediction 610, a brightening of pixels in a region of current video frame 102q in proximity to object 212 involved with action prediction 610, an obscuration of object 212 involved with action prediction 610, and blanking current video frame 102q. Operation 836 displays current video frame 102q subject to annotation 210 for current video frame 102q. Otherwise, operation 838 displays current video frame 102q normally.

Figure 9:
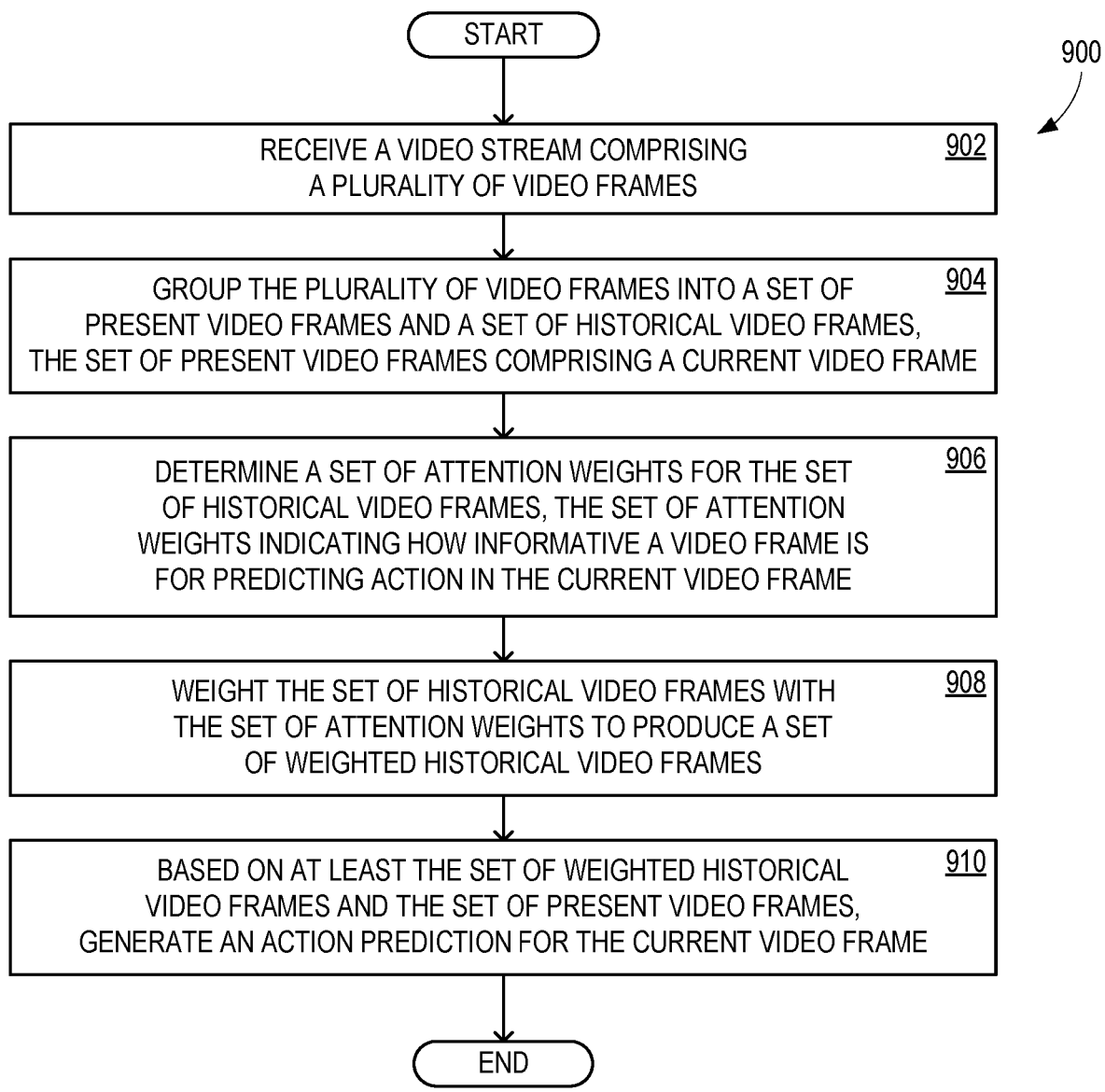
FIG. 9 shows another flowchart illustrating exemplary operations that may be performed using examples of the architecture of FIG. 1.

FIG. 9 shows a flowchart 900 illustrating exemplary operations that may be performed by architecture 100. In some examples, operations described for flowchart 900 are performed by computing device 1000 of FIG. 10. Flowchart 900 commences with operation 902, which includes receiving a video stream comprising a plurality of video frames. Operation 904 includes grouping the plurality of video frames into a set of present video frames and a set of historical video frames, the set of present video frames comprising a current video frame.

Operation 906 includes determining a set of attention weights for the set of historical video frames, the set of attention weights indicating how informative a video frame is for predicting action in the current video frame. Operation 908 includes weighting the set of historical video frames with the set of attention weights to produce a set of weighted historical video frames. Operation 910 includes, based on at least the set of weighted historical video frames and the set of present video frames, generating an action prediction for the current video frame.

Additional Examples

An example system comprises: a processor; and a computer-readable medium storing instructions that are operative upon execution by the processor to: receive a video stream comprising a plurality of video frames; group the plurality of video frames into a set of present video frames and a set of historical video frames, the set of present video frames comprising a current video frame; determine a set of attention weights for the set of historical video frames, the set of attention weights indicating how informative a video frame is for predicting action in the current video frame; weight the set of historical video frames with the set of attention weights to produce a set of weighted historical video frames; and based on at least the set of weighted historical video frames and the set of present video frames, generate an action prediction for the current video frame.

An example computerized method comprises: receiving a video stream comprising a plurality of video frames; grouping the plurality of video frames into a set of present video frames and a set of historical video frames, the set of present video frames comprising a current video frame; determining a set of attention weights for the set of historical video frames, the set of attention weights indicating how informative a video frame is for predicting action in the current video frame; weighting the set of historical video frames with the set of attention weights to produce a set of weighted historical video frames; and based on at least the set of weighted historical video frames and the set of present video frames, generating an action prediction for the current video frame.

One or more example computer storage devices have computer-executable instructions stored thereon, which, on execution by a computer, cause the computer to perform operations comprising: receiving a video stream comprising a plurality of video frames; grouping the plurality of video frames into a set of present video frames and a set of historical video frames, the set of present video frames comprising a current video frame; determining a set of attention weights for the set of historical video frames, the set of attention weights indicating how informative a video frame is for predicting action in the current video frame; weighting the set of historical video frames with the set of attention weights to produce a set of weighted historical video frames; and based on at least the set of weighted historical video frames and the set of present video frames, generating an action prediction for the current video frame.

Alternatively, or in addition to the other examples described herein, examples include any combination of the following:

based on at least the action prediction for the current video frame, generating an annotation for the current video frame;

displaying the current video frame subject to the annotation for the current video frame;
determining the set of attention weights comprises determining, for each video frame of the set of historical video frames, a position-guided gating score;
the plurality of video frames comprises a set of history frames, and for each history frame in the set of history frames, a set of subsequently-observed video frames;
the set of subsequently-observed video frames is more recent than the history frame;
based on at least the set of history frames and their sets of subsequently-observed video frames, extracting features from the set of historical video frames;
encoding the extracted features;
extracting features does not use optical flow;
performing background suppression;
the action prediction comprises a confidence;
performing the background suppression comprises weighting low confidence video frames more heavily, with separate emphasis on action and background classes, for a classifier that generates the action prediction;
the action prediction comprises a no action prediction or an action class prediction selected from a plurality of action classes;
the set of present video frames and the set of historical video frames overlaps;
for each video frame in the set of historical video frames, determining a latent encoding;
each attention weight of the set of attention weights is positive-valued;
the set of attention weights is within a range of zero to a maximum positive value, wherein a value between zero and one suppresses attention to a video frame and a value between one and the maximum positive value enhances attention to a video frame;
the set of attention weights enhances or suppresses video frames of the set of historical video frames based on at least how informative a video frame is for predicting action in the current video frame;
the annotation for the current video frame comprises an annotation selected from the list consisting of an outline of an object involved with the action prediction, a brightening of pixels in a region of the current video frame in proximity to the object involved with the action prediction, an obscuration of the object involved with the action prediction, and blanking the current video frame;
the sets of subsequently-observed video frames are weighted with previously-determined attention weights;
weighting the sets of subsequently-observed video frames with previously-determined attention weights;
encoding the extracted features comprises using cross-attention to project a variable length portion of the plurality of video frames to a fixed-length learned latent encoding;
generating the action prediction for the current video frame comprises cross-attending an encoded history that is based on at least the set of weighted historical video frames with a self-attention network output that is based on at least encoded extracted features of the set of present video frames; and
extracting features uses optical flow.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
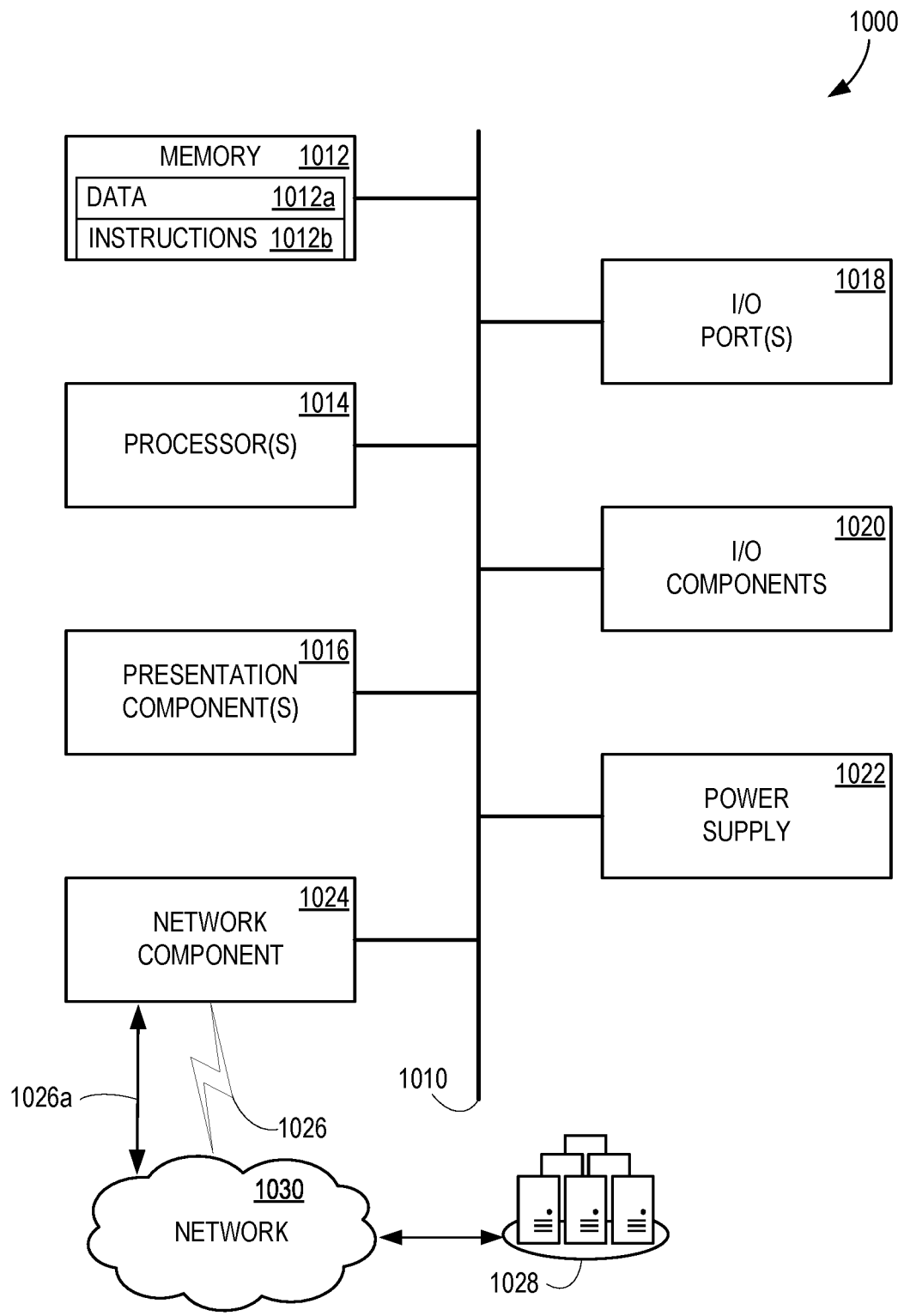
FIG. 10 shows a block diagram of an example computing device suitable for implementing some of the various examples disclosed herein.

FIG. 10 is a block diagram of an example computing device 1000 (e.g., a computer storage device) for implementing aspects disclosed herein, and is designated generally as computing device 1000. In some examples, one or more computing devices 1000 are provided for an on-premises computing solution. In some examples, one or more computing devices 1000 are provided as a cloud computing solution. In some examples, a combination of on-premises and cloud computing solutions are used. Computing device 1000 is but one example of a suitable computing environment and is not intended to suggest any limitation as to the scope of use or functionality of the examples disclosed herein, whether used singly or as part of a larger set.

Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer storage memory 1012, one or more processors 1014, one or more presentation components 1016, input/output (I/O) ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer storage media referenced below and operatively provide storage of computer-readable instructions, data structures, program modules and other data for the computing device 1000. In some examples, memory 1012 stores one or more of an operating system, a universal application platform, or other program modules and program data. Memory 1012 is thus able to store and access data 1012a and instructions 1012*b* that are executable by processor 1014 and configured to carry out the various operations disclosed herein.

In some examples, memory 1012 includes computer storage media. Memory 1012 may include any quantity of memory associated with or accessible by the computing device 1000. Memory 1012 may be internal to the computing device 1000 (as shown in FIG. 10), external to the computing device 1000 (not shown), or both (not shown). Additionally, or alternatively, the memory 1012 may be distributed across multiple computing devices 1000, for example, in a virtualized environment in which instruction processing is carried out on multiple computing devices 1000. For the purposes of this disclosure, "computer storage media," "computer-storage memory," "memory," and "memory devices" are synonymous terms for the computer-storage memory 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1024 communicates over wireless communication link 1026 and/or a wired communication link 1026*a* to a remote resource 1028 (e.g., a cloud resource) across network 1030. Various different examples of communication links 1026 and 1026*a* include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
      receive a video stream comprising a plurality of video frames;
      group the plurality of video frames into a set of present video frames and a set of historical video frames, the set of present video frames comprising a current video frame;
      based on at least the set of historical video frames and the set of present video frames, generate an action prediction for the current video frame; and
      perform background suppression, wherein the action prediction comprises a confidence and wherein performing the background suppression comprises:
         generating a loss function that weights low confidence video frames more heavily, with separate emphasis on action and background classes, for a classifier that generates the action prediction.

2. The system of claim 1, wherein the instructions are further operative to:
   determine a set of attention weights for the set of historical video frames, the set of attention weights indicating how informative a video frame is for predicting action in the current video frame; and
   weight the set of historical video frames with the set of attention weights to produce a set of weighted historical video frames, wherein generating the action prediction for the current video frame is based on at least the set of weighted historical video frames and the set of present video frames.

3. The system of claim 2, wherein determining the set of attention weights comprises:
   determining, for each video frame of the set of historical video frames, a position-guided gating score.

4. The system of claim 1, wherein the instructions are further operative to:
   based on at least the action prediction for the current video frame, generate an annotation for the current video frame; and
   display the current video frame subject to the annotation for the current video frame.

5. The system of claim 1, wherein the action prediction comprises a no action prediction or an action class prediction selected from a plurality of action classes.

6. The system of claim 1, wherein the instructions are further operative to:
   based on at least the set of historical video frames and the set of present video frames, generate a future action prediction for a video frame not yet observed.

7. The system of claim 6, wherein the future action prediction is based on at least a predicted trajectory of an autonomous driving vehicle.

8. A computerized method comprising:
   receiving a video stream comprising a plurality of video frames;
   grouping the plurality of video frames into a set of present video frames and a set of historical video frames, the set of present video frames comprising a current video frame;
   based on at least the set of historical video frames and the set of present video frames, generating an action prediction for the current video frame; and
   performing background suppression, wherein the action prediction comprises a confidence and wherein performing the background suppression comprises:
      generating a loss function that weights low confidence video frames more heavily, with separate emphasis on action and background classes, for a classifier that generates the action prediction.

9. The method of claim 8, further comprising:
   determining a set of attention weights for the set of historical video frames, the set of attention weights indicating how informative a video frame is for predicting action in the current video frame; and
   weighting the set of historical video frames with the set of attention weights to produce a set of weighted historical video frames, wherein generating the action prediction for the current video frame is based on at least the set of weighted historical video frames and the set of present video frames.

10. The method of claim 9, wherein determining the set of attention weights comprises:
    determining, for each video frame of the set of historical video frames, a position-guided gating score.

11. The method of claim 8, further comprising:
    based on at least the action prediction for the current video frame, generating an annotation for the current video frame; and
    displaying the current video frame subject to the annotation for the current video frame.

12. The method of claim 8, wherein the action prediction comprises a no action prediction or an action class prediction selected from a plurality of action classes.

13. The method of claim 8, further comprising:
based on at least the set of historical video frames and the set of present video frames, generating a future action prediction for a video frame not yet observed.

14. The method of claim 13, wherein the future action prediction is based on at least a predicted trajectory of an autonomous driving vehicle.

15. One or more computer storage devices having computer-executable instructions stored thereon, which, on execution by a computer, cause the computer to perform operations comprising:
receiving a video stream comprising a plurality of video frames;
grouping the plurality of video frames into a set of present video frames and a set of historical video frames, the set of present video frames comprising a current video frame;
based on at least the set of historical video frames and the set of present video frames, generating an action prediction for the current video frame; and
performing background suppression, wherein the action prediction comprises a confidence and wherein performing the background suppression comprises:
generating a loss function that weights low confidence video frames more heavily, with separate emphasis on action and background classes, for a classifier that generates the action prediction.

16. The one or more computer storage devices of claim 15, wherein the operations further comprise:
determining a set of attention weights for the set of historical video frames, the set of attention weights indicating how informative a video frame is for predicting action in the current video frame; and
weighting the set of historical video frames with the set of attention weights to produce a set of weighted historical video frames, wherein generating the action prediction for the current video frame is based on at least the set of weighted historical video frames and the set of present video frames.

17. The one or more computer storage devices of claim 16, wherein determining the set of attention weights comprises:
determining, for each video frame of the set of historical video frames, a position-guided gating score.

18. The one or more computer storage devices of claim 16, wherein the operations further comprise:
based on at least the action prediction for the current video frame, generating an annotation for the current video frame; and
displaying the current video frame subject to the annotation for the current video frame.

19. The one or more computer storage devices of claim 15, wherein the action prediction comprises a no action prediction or an action class prediction selected from a plurality of action classes.

20. The one or more computer storage devices of claim 15, wherein the operations further comprise:
based on at least the set of historical video frames and the set of present video frames, generating a future action prediction for a video frame not yet observed.

* * * * *